United States Patent
Ramabaja

(10) Patent No.: US 12,008,569 B2
(45) Date of Patent: Jun. 11, 2024

(54) TRANSACTION VERIFICATION SYSTEM AND METHOD OF OPERATION THEREOF

(71) Applicant: FETCH.AI LIMITED, Bury St Edmunds (GB)

(72) Inventor: Lum Ramabaja, Bury St Edmunds (GB)

(*) Notice: Subject to any disclaimer, the term of this patent is extended or adjusted under 35 U.S.C. 154(b) by 158 days.

(21) Appl. No.: 17/792,997

(22) PCT Filed: Jan. 15, 2021

(86) PCT No.: PCT/IB2021/050286
§ 371 (c)(1),
(2) Date: Jul. 14, 2022

(87) PCT Pub. No.: WO2021/144747
PCT Pub. Date: Jul. 22, 2021

(65) Prior Publication Data
US 2023/0108083 A1 Apr. 6, 2023

(30) Foreign Application Priority Data
Jan. 17, 2020 (EP) .................................. 20020027

(51) Int. Cl.
*G06Q 20/40* (2012.01)
*G06Q 20/38* (2012.01)
*H04L 9/00* (2022.01)

(52) U.S. Cl.
CPC ....... *G06Q 20/401* (2013.01); *G06Q 20/3827* (2013.01); *G06Q 20/389* (2013.01); *H04L 9/50* (2022.05); *G06Q 2220/00* (2013.01)

(58) Field of Classification Search
CPC ............ G06Q 20/401; G06Q 20/3827; G06Q 20/389; G06Q 2220/00; H04L 9/50
See application file for complete search history.

(56) References Cited

U.S. PATENT DOCUMENTS 11,188,535 B2 * 11/2021 Chen ................. G06F 16/24544
11,249,985 B2 * 2/2022 Wu ..................... G06F 16/9024
(Continued)

OTHER PUBLICATIONS

Roman Blum, et al., Superlight—A Permissionless, Light-client Only Blockchain with Self-Contained Proofs and BLS Signatures, Jan. 8, 2019, arxiv.org, pp. 1-7 (Year: 2019).*
(Continued)

*Primary Examiner* — Nilesh B Khatri
(74) *Attorney, Agent, or Firm* — RC Trademark Company

(57) ABSTRACT

A transaction verification system that, when in operation, verifies and provides tamper-proof recordation of data entities of one or more transactions in a blockchain with an efficient memory space management. The system comprises a plurality of computing nodes, wherein each computing node executes a pre-processing operation to obtain and store therein a corresponding bloom block. The bloom blocks of the computing nodes are different from any block of the blockchain, wherein, via its bloom block, each computing node includes a plurality of root hashes of a plurality of bloom trees and one distributed bloom filter. In order to verify a presence of a first transaction, a given computing node of the plurality of computing nodes initiates an interactive proof by interacting with certain computing nodes. The verification is performed without storing a copy of the blockchain in the plurality of computing nodes to reduce memory use in computing nodes.

15 Claims, 8 Drawing Sheets

(56) References Cited

U.S. PATENT DOCUMENTS

| | | | | |
|---|---|---|---|---|
| 2020/0278963 A1* | 9/2020 | Destefanis | .......... | H04L 67/1074 |
| 2021/0083852 A1* | 3/2021 | Destefanis | .............. | G06F 21/64 |
| 2022/0005004 A1* | 1/2022 | Xu | ..................... | G06Q 20/0655 |
| 2022/0292489 A1* | 9/2022 | Mackay | .................. | G06F 21/64 |
| 2023/0015569 A1* | 1/2023 | Davies | ............... | G06Q 20/3827 |

OTHER PUBLICATIONS

Lum Ramabaja, et al., The Distributed Bloom Filter, Oct. 17, 2019, arxiv.org, pp. 1-17 (Year: 2019).*

Kaihua Qin, et al., Applying Private Information Retrieval to Lightweight Bitcoin Clients, Aug. 5, 2019, IEEE, pp. 60-72 (Year: 2019).*

Tang et al., published "INCBM-TREE: Outsourcing Big Stream with Authenticated Freshness", in nis-ita.org, dated Aug. 29, 2013, 12 pages.

Zhang et al., published "Chaintegrity: blockchain-enabled large-scale e-voting system with robustness and universal verifiability", in International Journal of Information Security, vol. 19, dated Sep. 3, 2019, pp. 323-341.

Ramabaja et al., published "The Distributed Bloom Filter", in arxiv.org, Cornell University Library, dated Oct. 17, 2019, 17 pages.

Extended European Search Report mailed in EP Application No. EP20020027.7 dated Jul. 21, 2020, 4 pages.

International Search Report and Written Opinion of the International Searching Authority mailed in PCT Application No. PCT/IB2021/050286 dated May 18, 2021, 11 pages.

Notification Concerning Transmittal of International Preliminary Report on Patentability mailed in PCT Application No. PCT/IB2021/050286 dated Jul. 28, 2022, 9 pages.

* cited by examiner

TRANSACTION VERIFICATION SYSTEM AND METHOD OF OPERATION THEREOF

TECHNICAL FIELD

The present disclosure relates generally to computer-related data security, communication bandwidth management, and memory space management associated with transaction verification systems, for example, a transaction verification system that includes computing nodes that are mutually communicatively coupled via a data communication network to efficiently exchange data therebetween; and more specifically to a transaction verification system that verifies and provides tamper-proof recordation of data entities of transactions in a blockchain with an efficient memory space management of the computing nodes. Moreover, the present disclosure relates to methods of (namely, to methods for) operating the aforementioned transaction verification systems. Furthermore, the present disclosure also relates to computer program products comprising non-transitory computer-readable storage media having computer-readable instructions stored thereon, the computer-readable instructions being executable by a computerized device comprising processing hardware to execute aforementioned methods.

BACKGROUND

Typically, in a conventional system (e.g. a blockchain system), computing nodes that have a local copy of the whole blockchain are referred to as "full nodes". Full nodes can send and receive transactions, as well as optionally participate in the process of conventional block validation (aka mining). As blockchains became ever larger, fewer and fewer nodes are able to compete with the ever-growing storage requirements of the conventional system. Moreover, in a traditional blockchain implementation, whenever a new block gets created, all its contents have to be transmitted to other peers (i.e. other computing nodes), which results in inefficiencies in communication bandwidth management.

Currently, certain attempts have been made to manage the problem of inefficiencies in memory space management and communication bandwidth to allow any given node (also referred to as "normal" users) to participate in verification of transaction in the conventional system (e.g. a blockchain protocol) using the concept of simplified payment verification (SPV). Typically, conventional computing nodes that employ the simplified payment verification are referred to as "thin clients", "thin" nodes, or "lightweight" nodes. Although conventional systems, like the 'thin clients", do not need to store the whole blockchain, but they still need to store a copy of the block headers of the blockchain, which comparatively require lower storage capacity but still becomes memory intensive over a period of time. Although storing a copy of the block headers of the blockchain allows the 'thin clients" having comparatively lower storage abilities to participate in sending and receiving transactions, however, the conventional systems, such as the "thin clients" cannot validate any blocks. Such conventional systems, such as the "thin clients", at best can only verify the presence of transactions in a block and still need to store copy of the block headers of the blockchain (which is still memory space intensive). It is known that memory is costly and adding more memory to a given computing node means significantly increasing the overall hardware cost of the conventional system. Thus, it is a major technical problem as to how to handle ever growing storage requirements of a conventional system (e.g. a blockchain-based system), where each computing node is facing a technical challenge to actively participate in sending and receiving transactions and their verification, if such nodes do not have enough storage capacity. Moreover, conventional systems by virtue of inefficient bandwidth and memory space management also results in many other technical inefficiencies, for example, increased power requirements, an increased time to access to data memory, high data processor energy use and energy dissipation by data processing resources during transactions, in order to process huge amount of data in conventional systems for verified recordation of data entities of transactions in the blockchain.

Therefore, in light of the foregoing technical problems of known art, there exists a need to provide an improved transaction verification system, and also an improved method of (namely, improved method for) operating the improved transaction verification system for addressing aforementioned drawbacks.

SUMMARY

The present disclosure seeks to provide a transaction verification system that, when in operation, verifies and provides tamper-proof recordation of data entities of one or more transactions in a blockchain, wherein the system comprises a plurality of computing nodes that are mutually communicatively coupled via a data communication network to exchange data therebetween, and where a given computing node of the plurality of computing nodes is able to verify a presence of the one or more transactions in the blockchain. The present disclosure seeks to improve how each of the plurality of computing nodes functions to handle ever growing storage requirements (i.e. to improve memory space management in each computing node) and provide communication bandwidth-efficiency, where any computing node of the plurality of computing nodes is able to actively participate in verification of the presence of the one or more transactions in the blockchain, even if such computing nodes do not have enough storage capacity, and where the verification of the presence of the one or more transactions can be performed without the need to store a copy of the blockchain (or even a copy of the block headers of the blockchain) in each of the plurality of computing nodes.

The present disclosure also seeks to provide a method of (namely, a method for) operating the transaction verification system to verify and provide tamper-proof recordation of data entities of one or more transactions in a blockchain, wherein the transaction verification system comprises a plurality of computing nodes that are mutually communicatively coupled via a data communication network to exchange data therebetween, wherein a given computing node of the plurality of computing nodes is able to verify a presence of the one or more transactions in the blockchain. The present disclosure seeks to improve methods of functioning of each of the plurality of computing nodes to handle ever growing storage requirements (i.e. to improve memory space management in each computing node) and increase bandwidth-efficiency during exchange of data among the plurality of computing nodes over the decentralized data communication network.

In one aspect, an embodiment of the present disclosure provides a transaction verification system that, when in operation, verifies and provides tamper-proof recordation of data entities of one or more transactions in a blockchain, wherein the system comprises a plurality of computing nodes that are mutually communicatively coupled via a data communication network to exchange data therebetween, wherein a given computing node of the plurality of computing nodes is able to verify a presence of the one or more transactions in the blockchain, characterized in that:

each computing node executes a pre-processing operation to obtain and store therein a corresponding bloom block, wherein the bloom blocks of the computing nodes are different from any block of the blockchain, wherein, via its bloom block, each computing node includes a plurality of root hashes of a plurality of bloom trees and a distributed bloom filter, wherein the plurality of bloom trees have distributed bloom filters that are distributed within the plurality of computing nodes, wherein the distributed bloom filters define a set of transactions, and the plurality of bloom trees are associated with different distributed bloom filters spread across the plurality of computing nodes, wherein, in order to verify a presence of a first transaction of the one or more transactions, a given computing node of the plurality of computing nodes initiates an interactive proof by interacting with a specified number of computing nodes from the plurality of computing nodes, wherein the interactive proof is initiated post-completion of the pre-processing operation at each computing node, and wherein the given computing node initiates the interactive proof by:

(i) communicating a request for a multi-proof to the specified number of computing nodes from the plurality of computing nodes; and (ii) obtaining a proof of absence from one of the specified number of computing nodes, or proofs of presence from the specified number of computing nodes, to verify the presence of the first transaction, wherein verifying the presence of the first transaction is performed without storing a copy of the blockchain in the plurality of computing nodes to reduce memory use in each of the plurality of computing nodes.

The present disclosure is of advantage that there is provided an at least partial solution for operation of the transaction verification systems to enable more efficient handling of storage hardware (i.e. an improved and efficient memory space management) of each computing node of the plurality of computing nodes while allowing an active participation of any computing node in sending and receiving transactions and their verification, without the need (or without any obligation) to store a local copy of the whole blockchain or a copy of the block headers of the blockchain in any of the plurality of computing nodes. The transaction verification system makes economical use of memory as only a bloom block (having only a distributed bloom filter of limited size and a few hashes, such as the plurality of root hashes of bloom trees) is stored in the memory of each computing node that require only a fraction of the storage that existing systems and method needs (i.e. as compared to conventional blockchain systems and 'thin clients" based system, the storage requirements of each computing node is significantly reduced based on the operation of the aforementioned transaction verification system of the present disclosure).

In another aspect, the present disclosure provides a method of (namely, a method for) operating a transaction verification system to verify and provide tamper-proof recordation of data entities of one or more transactions in a blockchain, wherein the system comprises a plurality of computing nodes that are mutually communicatively coupled via a data communication network to exchange data therebetween, wherein a given computing node of the plurality of computing nodes is able to verify a presence of the one or more transactions in the blockchain, characterized in that the method includes:

(i) arranging for each computing node to execute a pre-processing operation to obtain and store therein a corresponding bloom block, wherein the bloom blocks of the computing nodes are different from any block of the blockchain, wherein, via its bloom block, each computing node includes a plurality of root hashes of a plurality of bloom trees and a distributed bloom filter, wherein the plurality of bloom trees have distributed bloom filters that are distributed within the plurality of computing nodes, wherein the distributed bloom filters define a set of transactions, and the plurality of bloom trees are associated with different distributed bloom filters spread across the plurality of computing nodes, (ii) arranging for, in order to verify a presence of a first transaction of the one or more transactions, a given computing node of the plurality of computing nodes to initiate an interactive proof by interacting with a specified number of computing nodes from the plurality of computing nodes, wherein the interactive proof is initiated post-completion of the pre-processing operation at each computing node, and wherein the given computing node initiates the interactive proof by:

(i) communicating a request for a multi-proof to the specified number of computing nodes from the plurality of computing nodes; and (ii) obtaining a proof of absence from one of the specified number of computing nodes, or proofs of presence from the specified number of computing nodes, to verify the presence of the first transaction, wherein verifying the presence of the first transaction is performed without storing a copy of the blockchain in the plurality of computing nodes to reduce memory use in each of the plurality of computing nodes.

Advantageously, the method improves the functioning of each of the plurality of computing nodes by operating the transaction verification system in such a manner that any computing node of the plurality of computing nodes is able to actively participate in verification of the presence of the one or more transactions in the blockchain without the need to store a local copy of the blockchain (or even a copy of the block headers of the blockchain) in each of the plurality of computing nodes.

In yet another aspect, an embodiment of the present disclosure provides a computer program product comprising non-transitory computer-readable storage media having computer-readable instructions stored thereon, the computer-readable instructions being executable by a computerized device comprising processing hardware to execute the aforesaid method Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
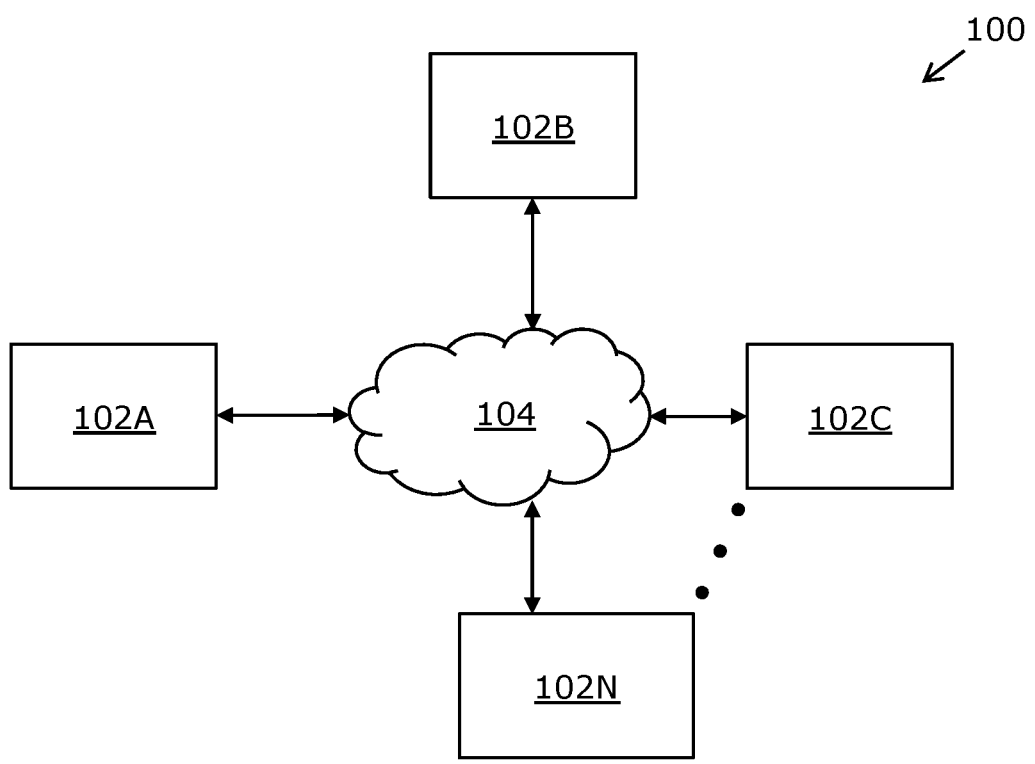
FIG. 1 is an illustration of a transaction verification system, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

The present disclosure seeks to provide a solution to a technical problem of how to handle ever growing storage requirements of a conventional system (e.g. a conventional blockchain-based system or a "thin client" system), where each computing node is facing a technical challenge to actively participate in sending and receiving transactions and their verification, if such nodes do not have enough storage capacity (i.e. a hardware limitation in terms of limited storage capacity or memory space). Additionally, the present disclosure also addresses the technical problem of inefficient communication bandwidth management in order to verify and provide tamper-proof recordation of data entities of one or more transactions in a blockchain.

In one aspect, the present disclosure provides a transaction verification system that, when in operation, verifies and provides tamper-proof recordation of data entities of one or more transactions in a blockchain. In an example, data entities are potentially associated with payment related transaction, data entities associated with medical records of patients, data entities associated with virtual identities of employees, data entities associated with supply chain of a company, data entities associated with internet of things (IOT) devices and the like, but not limited thereto. The transaction verification system provides tamper-proof recordation of data entities in the blockchain upon secured verification of given transactions in a bandwidth-efficient and storage efficient way to enable recording (or registration) of only valid transactions in the blockchain. The transaction verification system comprises a plurality of computing nodes that are mutually communicatively coupled via a data communication network to exchange data therebetween, wherein a given computing node of the plurality of computing nodes is able to verify a presence of the one or more transactions in the blockchain. The term "transaction verification system" broadly refers to a combination of hardware and/or software components implemented on each of the plurality of computing nodes to enable each computing node to verify and provide tamper-proof recordation of data entities of one or more transactions in the blockchain. Alternatively stated, the term "transaction verification system" refers to a processing system for data associated with transactions between the two or more transacting parties such as computing nodes; such transactions can include exchanges of data, for example data in encrypted and/or obfuscated form. The transaction verification system enables in obtaining proof of absence or proof of presence of a given transaction to verify the given transaction in the blockchain. The term 'transaction verification system' is interchangeably used with the term 'system' in the present disclosure. The transaction verification system is potentially also referred to as an "echo network", and each of the plurality of computing nodes of the transaction verification system is potentially also referred to as an "echo node".

The term "computing node" refers to an electronic device associated with (or used by) a user that is capable of enabling the user to perform specific tasks such as recording and sharing of information (such as transactions) with other computing nodes of the plurality of computing nodes. Furthermore, the computing node is intended to be broadly interpreted to include any electronic device that is potentially used for voice and/or data communication over a wireless communication network. Examples of each computing node of the plurality of computing nodes include, but are not limited to a smartphone, a laptop computer, a tablet computer, an Internet-of-Things (IoT) device, a machine type communication device, a fifth generation (5G) new radio (NR) enabled device, 2G, 3G, or 4G enabled device, a personal computer, a handheld device, a server, or any other electronic device. Additionally, each of the plurality of computing nodes includes a memory, a processor, a network interface card, and an input/output device, such as a microphone, a speaker, a keypad, and/or a display.

The term "data communication network" refers to an arrangement of interconnected programmable and/or non-programmable components that are configured to facilitate data communication between one or more computing nodes. Moreover, the data communication network potentially includes, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the data communication network includes wired or wireless communication that can be carried out via any number of known protocols, including, but not limited to, Internet Protocol (IP), Wireless Access Protocol (WAP), Frame Relay, or Asynchronous Transfer Mode (ATM).

The term "transaction(s)" refers to a unit of a task that is stored in records once verified. In a conventional blockchain based system or a "thin client" based system, these records are grouped and stored in blocks, where the blocks are executed, implemented and stored in blockchain only after the validation by all participating nodes involved in conventional blockchain network. In conventional systems, each of the full nodes need to store an entire copy of blockchain in its memory, in order to send and receive transactions, as well as optionally participate in the process of conventional block validation (aka mining). As blockchains became ever larger, fewer and fewer nodes are able to compete with the ever-growing storage requirements of the conventional system. Moreover, in a traditional blockchain implementation, whenever a new block gets created, all its contents have to be transmitted to other peers (i.e. other computing nodes), which results in inefficiencies in communication bandwidth management. Moreover, although conventional systems, like the 'thin clients", do not need to store the whole blockchain, but they still need to store a copy of the block headers of the blockchain, which comparatively require lower storage capacity but still becomes memory intensive over a period of time. In contradiction to the conventional systems, the transaction verification system of the present disclosure enable more efficient handling of storage hardware (i.e. an improved and efficient memory space management) of each computing node of the plurality of computing nodes while allowing an active participation of any computing node in sending and receiving transactions and their verification, without the need (or without any obligation) to store a local copy of the whole blockchain or a copy of the block headers of the blockchain in any of the plurality of computing nodes. The transaction verification system makes economical use of memory as only a bloom block (having only a distributed bloom filter of limited size and a few hashes, such as the plurality of root hashes of bloom trees) is stored in the memory of each computing node that require only a fraction of the storage that existing systems and method needs (i.e. as compared to conventional blockchain systems and 'thin clients" based system, the storage requirements of each computing node is significantly reduced based on the operation of the aforementioned transaction verification system of the present disclosure).

In the transaction verification system, each computing node executes a pre-processing operation to obtain and store therein a corresponding bloom block. In contradiction to existing systems, each computing node (also referred to as 'echo node') of the plurality of computing nodes in the present disclosure stores a unique bloom block. Alternatively stated, the bloom block for each computing node is unique for that computing node on account of contents of the bloom block. The echo nodes of the present disclosure in comparison to "thin clients" or "thin nodes" of the existing systems are storage efficient and thereby require less storage space for verification of the plurality of transactions. The echo nodes in the present disclosure do not store the block headers as such and thereby requires a smaller amount of storage space in comparison to storage space required by "thin nodes". The term "pre-processing operation" refers to any collection or set of instructions executable by a processor of a given computing node of the plurality of computing nodes to obtain a bloom block. Additionally, the pre-processing operation is intended to encompass such instructions stored in storage medium such as random-access memory (RAM), a hard disk, optical disk, or so forth, and is also intended to encompass software stored on a read only memory (ROM) or so forth of the computing node. In an example, the pre-processing operation is potentially a one-time operation executed by each computing node of the plurality of computing nodes before they are ready to initiate an interactive proof to verify the presence of one or more transactions by interacting with other computing nodes.

In accordance with an embodiment, the transaction verification system operates to cause each computing node of the plurality of computing nodes to execute the pre-processing operation to communicate a request of block headers up to a first defined constant value to other computing nodes of the plurality of computing nodes. In an example, a computing node requests "N" block headers within a specified range from a full node network, where "N" represents a system-wide constant (i.e. the first defined constant value). Initially, in order to initiate the pre-processing operation to obtain a corresponding bloom block for each computing node, block headers for recently added blocks are potentially requested from certain known full nodes that store such block headers.

In accordance with an embodiment, the transaction verification system operates to cause each computing node of the plurality of computing nodes to execute the pre-processing operation to compute a plurality of distributed bloom filters up to a second defined constant value using a unique seed value. In continuation to the above example, the computing node then computes "M" distributed bloom filters (DBFs), where "M" is another system-wide constant (i.e. the second defined constant value). Each of the "M" distributed bloom filters is populated with Merkle roots of the "N" block headers. Each distributed bloom filter uses a unique seed value in the range of 1 to "M", i.e. every distributed bloom filter has another seed value (or the unique seed value).

It is known that a bloom filter is a space-efficient probabilistic data structure that enables in verifying if a transaction is not in a set. A bloom filter can either tell that a transaction might be in a set, or that a transaction definitely is not in a set. Moreover, to populate a bloom filter, a zero-bit array is usually initiated. Whenever a transaction is to be inserted into the bloom filter, a transaction is hashed "k" times and the indices to which the hashes point their value are turned to one. Moreover, when a presence of a transaction in the bloom filter is to be checked, it is checked if all the given indices have a one. If one of the indices is a zero, the transaction is never inserted into the bloom filter. However, due to false positive value of the bloom filter, the values of some indices for a given transaction might already be turned to one, even though the transaction is not inserted. The false positive value of a bloom filter can be controlled by modifying: a bloom filter size, a number of transactions inserted into a bloom filter, and a number of hash functions used per transaction. The term 'false positive value' is interchangeably used with the term 'false positive rate'.

To reduce the false positive rate of the bloom filter, distributed bloom filter is employed in the present disclosure. In an embodiment, distributed bloom filter is a data structure having an array that stores one of the binary bit values of "0" or "1" at each index of the array, wherein the one or more transactions are inserted in the one distributed bloom filter based on a position the "1" bit value at specified indices of the array. In an embodiment, the one distributed bloom filter has a first false positive value. The distributed bloom filter is similar to bloom filter discussed above, but incorporates two new steps: mapping of transactions gets determined by an initial seed value (which can be a counter, a random value and the like); and transactions do not get hashed "k" times, but instead the transactions get XORed with "k" pre-determined hashes. The term "XOR" is a binary logical function that gives a true output when only one of the inputs is true. As long as a computing node knows what seed value was used, the transactions can be correctly mapped to the distributed bloom filter. The creation of distributed bloom filter comprises various steps. At a first step, a seed value such as a counter is selected. At a second step, the counter gets hashed "k" times (for example $h_1$, $h_2$, $h_3$, $h_4$ to $h_k$ are the generated hashes). At a third step: every transaction hash (for example $H_1$ up to $H_{S'}$, where S' represents the set size) gets XORed with every hash ($h_1$, $h_2$, $h_3$, $h_4$ to $h_k$) generated in the second step. Generally, the transaction hashes have to be computed in existing blockchain systems and therefore the third step involves no additional computational costs. At a fourth step, modulo "m" of each generated value is taken (where "m" is the chosen bloom filter size) so that every generated integer lies in a desired range. At a fifth step, a bloom filter is populated with the values of step four to form a distributed bloom filter. Alternatively stated, transactions of a block (say a new block of blockchain created by a miner) gets inserted into "M" distributed bloom filters (DBFs). Each of these DBFs gets populated using a different counter, which results in different mappings.

Figure 3A:
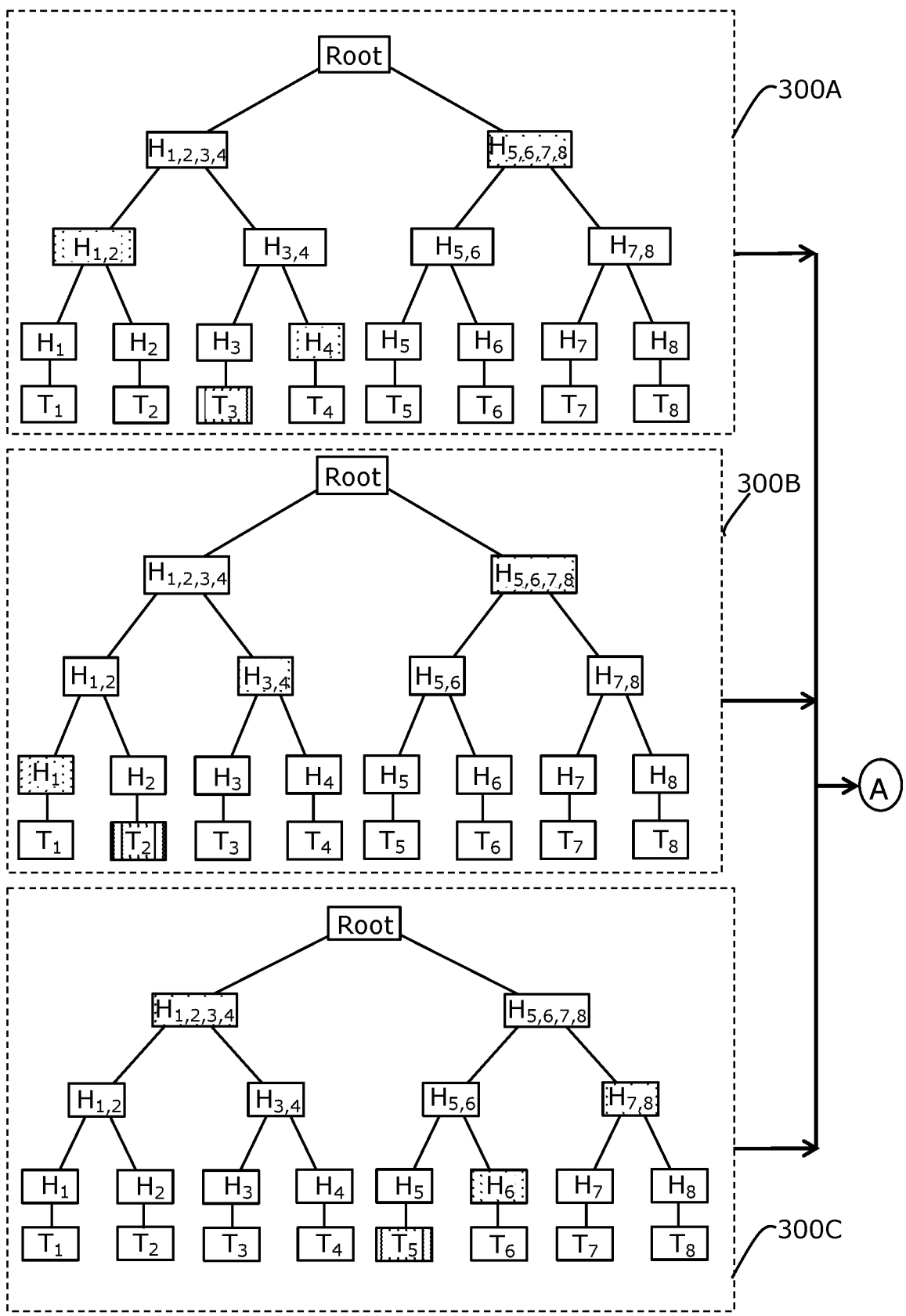
FIGS. 3A and 3B are illustrations that depict exemplary Merkle trees and an exemplary Merkle multi-proof that is used by the transaction verification system of FIG. 1, in accordance with an embodiment of the present disclosure.

In accordance with an embodiment, each of the "M" distributed bloom filters is populated with Merkle roots of the "N" block headers. Typically, in traditional systems, Merkle tree is employed for bandwidth-efficient and secure verification of the presence of a given transaction in the bloom filter. Merkle tree is a binary tree in which all leaf nodes (that are transactions such as $T_1$, $T_2$, $T_3$ to $T_8$) are associated with a hash (such as $H_1$, $H_2$, $H_3$ to $H_8$), and all none-leaf nodes are associated with a hash (such as $H_{1,2}$, $H_{3,4}$, $H_{5,6}$, $H_{6,7}$, $H_{1,2,3,4}$ and $H_{5,6,7,8}$), that is formed from the hashes of its child nodes. Moreover, a root hash of the Merkle tree is obtained by hashing the non-leaf nodes (such as $H_{1,2,3,4}$ and $H_{5,6,7,8}$). An example of such Merkle tree is shown in FIG. 3A. To verify that a single transaction is present in the Merkle tree, a series of hashes are provided, which when are hashed with the transaction hash (e.g. a hash of transaction ID), a root hash of the Merkle tree is recreated. Moreover, this series of hashes is also known as a Merkle proof. Generally, a recipient (computing node) of the Merkle proof already has a copy of the root.

Figure 3B:
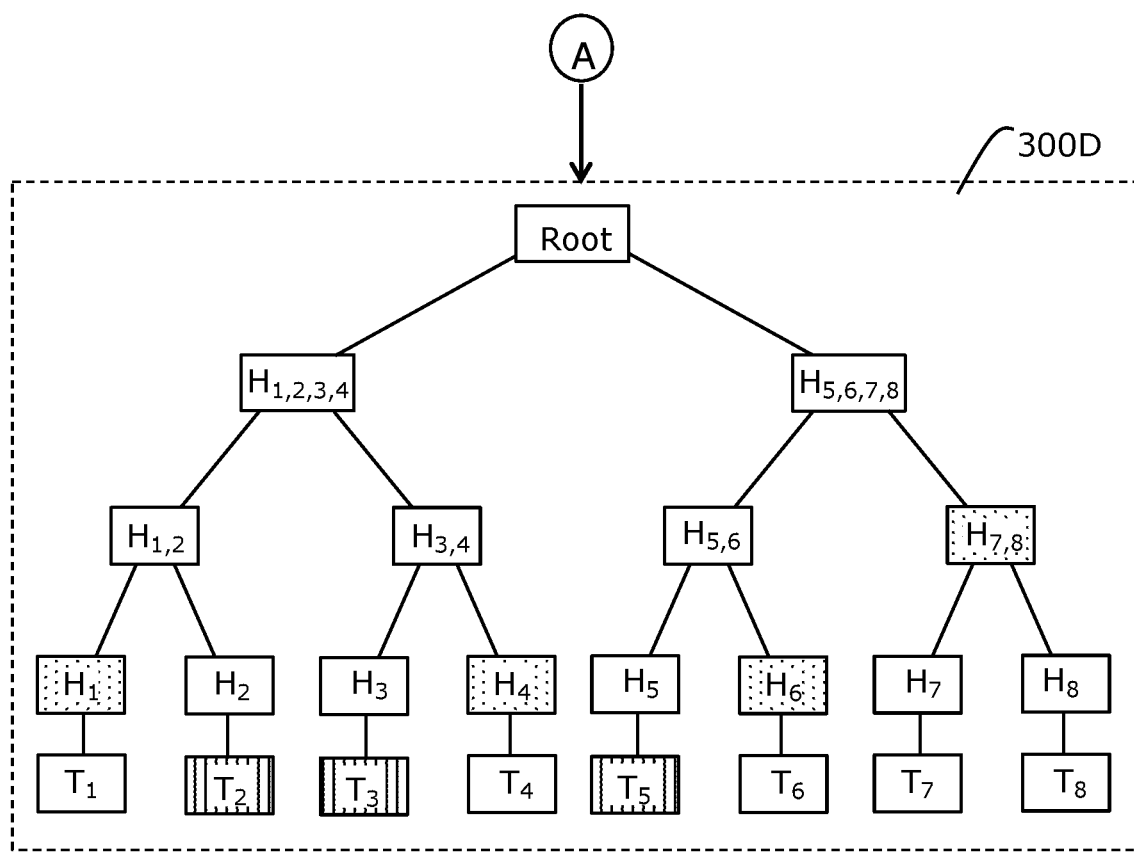

In the present disclosure, a Merkle multi-proof which is a group of Merkle proofs is employed by the transaction verification system, to prove the presence of a list of transactions that are in the same Merkle tree. An example of the Merkle multi-proof is shown in FIG. 3B. Moreover, by using the multi-proof, a number of hashes needed to verify the presence of a set of transactions can be reduced significantly. In an example, overlapping of three Merkle trees, most of the hashes can be recreated by previous hashes. For example, instead of using eight hashes to verify three transactions using three Merkle trees, one can prove the presence of the three transactions with only four hashes by using the Merkle multi-proof.

In accordance with an embodiment, the transaction verification system operates to cause each computing node of the plurality of computing nodes to execute the pre-processing operation further to calculate a plurality of root hashes of a plurality of bloom trees up to the defined second constant value for the plurality of distributed bloom filters. In the above example, "M" bloom tree root hashes are computed and stored at the computing node (each root hash of a bloom tree is computed from one of the generated distributed bloom filters). In the present disclosure, the bloom tree is employed which combines the distributed bloom filters with Merkle trees. Moreover, using the bloom tree, the presence, or absence of any transaction is verified and transmitted in a secure and bandwidth efficient way.

In accordance with an embodiment, the transaction verification system further operates to cause each computing node of the plurality of computing nodes to compute a bloom tree of the plurality of bloom trees, wherein in order to compute the bloom tree, the transaction verification system operates to cause each computing node to divide a distributed bloom filter of the plurality of plurality of distributed bloom filters into a set of chunks of bits. Optionally, the set of chunks of bits in a structure of the bloom tree is similar (although not same) to transactions in a structure of the Merkle tree. In other words, a bloom tree is a modified Merkle tree (i.e. an advanced Merkle tree) such that in comparison to Merkle tree where a transaction is hashed, in the bloom tree chunks of bits of distributed bloom filters are hashed. Thus, in an example, each of plurality of root hashes of the plurality of bloom trees is also referred to as a Merkle root of a bloom tree. In an example, the chunk of bits can be of size 256 bits, 512 bits or any other selected size.

In accordance with an embodiment, the transaction verification system further operates to cause each computing node to utilize the set of chunks of bits to compute the bloom tree, wherein each chunk of the set of chunks are hashed, and the hashes of each chunk are further hashed in a multitier structure until a root hash of the bloom tree is obtained. In an example, a bloom tree has chunks $C_1$, $C_2$, $C_3$ to $C_{16}$. In such an example, each pair of chunks such as $C_1$ and $C_2$, $C_3$, and $C_4$, to $C_{15}$ and $C_{16}$ are hashed to obtain hashes $H_1$, $H_2$, $H_3$, $H_4$, $H_5$, $H_6$, $H_7$ and $H_8$. Further, hashes $H_1$ and $H_2$ are further hashed to obtain one hash $H_{1,2}$. Similarly, hashes $H_3$ and $H_4$ are further hashed to obtain one hash $H_{3,4}$. Thereafter, the obtained hashes $H_{1,2}$ and $H_{3,4}$ are further hashed to derive a hash $H_{1,2,3,4}$, which is used to obtain the root hash. An example of the bloom tree with a root hash is shown and described, for example, in FIG. 4. Moreover, similar to computation of one bloom tree for one distributed bloom filter, as described above, the plurality of bloom trees is computed. In the above example, "M" root hashes of plurality of bloom trees are computed and temporally stored at each computing node (each root hash of a bloom tree is computed from one of the generated distributed bloom filters).

As discussed above, the plurality of bloom trees have distributed bloom filters that are distributed within the plurality of computing nodes. As the plurality of bloom trees are computed using the plurality of distributed bloom filters, it can be said that the plurality of bloom trees has distributed bloom filters. Further, as each node has one unique distributed bloom filter generated using a corresponding unique seed value, it can be deduced that different distributed bloom filters are distributed within the plurality of computing nodes. The plurality of bloom trees and the different distributed bloom filters are used in combination for verification of the one or more transactions in the blockchain. The distributed bloom filters define a set of transactions, and the plurality of bloom trees are associated with different distributed bloom filters spread across the plurality of computing nodes. As discussed above, as transactions of a block (say a new block of blockchain created by a miner) gets inserted into "M" distributed bloom filters (DBFs), it can be deduced that each distributed bloom filter define a set of transactions in hashed form. In other words, the plurality of bloom trees and distributed bloom filters are spread across the plurality of computing nodes to provide a common factor for achieving verification of the one or more transaction at any of the computing nodes.

In accordance with an embodiment, the transaction verification system operates to cause each computing node of the plurality of computing nodes to execute the pre-processing operation further to compute a threshold value at each computing node using its own public identifier. In the above example, the computing node computes the threshold value $(S)=P_{ID}$ mod "M" (where $P_{ID}$ is the public ID of the computing node). Moreover, each computing node of the plurality of computing nodes have a unique public ID.

In accordance with an embodiment, the transaction verification system operates to cause each computing node of the plurality of computing nodes to execute the pre-processing operation further to execute deletion of distributed bloom filters from the plurality of distributed bloom filters that are less than the computed threshold value to obtain the bloom block. In the above example, the computing node then deletes all the distributed bloom filters whose seed value is not equal to "S". Alternatively stated, the transaction verification system operates to cause each computing node to select one of the computed plurality of distributed bloom filters based on its public ID. This attribute usually allows a node to always know which of its peers (i.e. other computing nodes) have which distributed bloom filters.

In accordance with an embodiment, the transaction verification system operates to cause each computing node of the plurality of computing nodes to execute the pre-processing operation further to store the bloom block that includes one distributed bloom filter and the plurality of root hashes of the plurality of bloom trees, in each computing node after the executed deletion of the distributed bloom filters. Thus, beneficially, as each computing node (e.g. echo node) stores only one distributed bloom filter and the plurality of root hashes of the plurality of bloom trees, each computing node is thereby storage efficient in comparison to 'thin nodes" and 'full nodes' used in the conventional systems.

As discussed above, thus, via its bloom block, each computing node includes the plurality of root hashes of the plurality of bloom trees and the one distributed bloom filter. Alternatively stated, each participating computing node before being able to perform an interactive proof (i.e. an interactive bloom proof) executes the pre-processing operation, as discussed above. At the end of the pre-processing operation executed by each computing node of the plurality of computing nodes, each computing has its corresponding bloom block.

Alternatively stated, in accordance with an embodiment, the plurality of computing nodes comprises a different bloom block which differs in at least the stored distributed bloom filter post completion of the pre-processing operation at each computing node of the plurality of computing nodes. In an example, the difference in bloom blocks is due to different seed values of respective distributed bloom filters. Optionally, difference in bloom blocks enable secure and bandwidth-efficient verification of a presence of a given transaction in the blockchain.

Moreover, the bloom blocks of the computing nodes are different from any block of the blockchain. It will be appreciated that nodes (also referred to as 'full nodes') employed by the existing systems store copies of the entire blockchain to verify as well as exchange any given transaction in the blockchain. In the existing systems, the full nodes store all the transactions of the blockchain and therefore as the number of transactions keep increasing the full nodes require a large amount of storage space which also increases a cost associated therewith. Each computing node (e.g. echo nodes) in the present disclosure do not store the transactions as such (but stores only bloom block) and thereby requires a smaller amount of storage space in comparison to storage space required by full nodes. It is not required to store copies of the entire block-chain at each computing node that is not possible when the computing nodes are "thin clients" with limited data storage capacity. In an example, if a full node requires a storage space of, for example, 220 gigabytes, a thin node will require a storage space of, for example, about 4.64 gigabytes, whereas an echo node (i.e. a given computing node) of the transaction verification system will require a storage space of only, for example, about 0.03 gigabytes, which is a significant reduction in storage requirements resulting in comparatively very high efficiency in memory space management, and reduced hardware costs in terms of reduced memory capacity needs.

In accordance with an embodiment, each bloom block has necessary information to prove the presence of root hash (of bloom tree) (i.e. a Merkle root of the aforementioned modified Merkle tree or root of Merkle multi-proof) for a specific range in a blockchain. Moreover, when a given computing node wants to check if a transaction is valid, it first asks for the Merkle proof (Merkle multi-proof in this case), as well as for a block height. Further, once the root hash is created, the given computing node checks the corresponding bloom block (which can be determined based on a given block height), to see if the generated root hash is in the bloom block's distributed bloom filter. If the root hash of the transaction is not in the bloom block's distributed bloom filter, the given computing node considers that the transaction is not valid. If the root hash happens to be inside the bloom block's distributed bloom filter, the given computing node starts the interactive proof with other computing nodes of the plurality of computing nodes.

In the transaction verifying system, in order to verify a presence of a first transaction of the one or more transactions, the given computing node of the plurality of computing nodes initiates the interactive proof by interacting with a specified number of computing nodes from the plurality of computing nodes, wherein the interactive proof is initiated post-completion of the pre-processing operation at each computing node. The interactive proof is also referred to as "interactive bloom proof" as bloom blocks are employed in the verification by interacting with the specified number of computing nodes from the plurality of computing nodes. Beneficially, the interactive proof results in bandwidth-efficient verification of the presence of at least the first transaction of the one or more transactions. Moreover, the storage-wise efficiency gained by the Interactive proof (i.e. the interactive bloom proof) comes from computing nodes interacting with other nodes to prove the presence of transactions. It is estimated that approximately 40-90%, particularly about at least 70% more efficiency is gained in terms of storage space and bandwidth efficiency. Advantageously, the interactive proof ensures that there is no false positive in verification of the first transaction in comparison to a significant amount of false positive rates in the conventional techniques employing only bloom filters.

The given computing node initiates the interactive proof by:
  (i) communicating a request for a multi-proof to the specified number of computing nodes from the plurality of computing nodes; and
  (ii) obtaining a proof of absence from one of the specified number of computing nodes, or proofs of presence from the specified number of computing nodes, to verify the presence of the first transaction, wherein verifying the presence of the first transaction is performed without storing a copy of the blockchain in the plurality of computing nodes to reduce memory use in each of the plurality of computing nodes.

In an example, the given computing node that initiates the interactive proof, requests up to 'M' nodes for the multi-proof. For example, in a given bloom block of the given computing node, if the stored one distributed bloom filter has a false positive value of 0.0001, and then collecting multi-proofs from 20 computing nodes would have a false positive value of 0.0001 to the power 20. Therefore, the probability for a false positive value after the interactive proof is almost negligible in comparison to conventional technologies. For example, the probability for a false positive hit after such an interaction (i.e. the interactive proof), would be smaller than correctly estimating the bit sequence for, for example, a SHA256 cryptographic hash. Beneficially, verifying the presence of the first transaction is performed without storing a copy of the blockchain in the plurality of computing nodes to reduce memory use in each of the plurality of computing nodes. Beneficially, employing of the bloom block for verification of presence of the first transaction of the plurality of transactions, significantly reduces an amount of data that has to be communicated over the data communication network, thereby increasing bandwidth-efficiency. As each bloom block has 'M' root hashes, a computing node can quickly verify the presence of a given transaction, by interacting with other computing nodes. Moreover, employing of the bloom block for verification of presence of the first transaction enable use of "normal" users (having limited memory space) and of "thin clients", and provides that the bloom block stored at each computing node is a substitution for storing the complete block chain or block headers at each computing node, that is not possible for "thin clients" on account of data memory limitations. Moreover, using the bloom block for verification vastly reduces the amount of data that has to be communicated within the system.

In accordance with an embodiment, the distributed bloom filter has a first false positive value (e.g. the false positive value of 0.0001 as discussed in above example). Typically, the given computing node cannot know for sure that if it has encountered a false positive hit when verifying the first transaction. Because of this, the given computing node receives additional, cryptography verifiable information from the specified number of computing nodes. This is where the bloom trees and the plurality of root hashes of the plurality of bloom tress, are employed by the transaction verification system, as discussed above. Thus, the obtaining of the proofs of presence from the specified number of computing nodes (e.g. "M" nodes) during the interactive proof at least reduces the first false positive value by at least the specified number so that the presence of the first transaction is successfully confirmed. Therefore, no false positive hit can occur at the end of the interactive proof, thereby improving an accuracy in the verification of the first transaction.

In accordance with an embodiment, the transaction verification system operates to cause the given computing node to terminate the interaction with the specified number of computing nodes on receipt of the proof of absence from one of the specified number of computing nodes or on receipt of the proofs of presence from the specified number of computing nodes. In an example, the interaction either terminates when a computing node obtains proof of absence, or if it obtains 'M' proofs of presence (e.g. from up to "M" computing nodes).

Optionally, the transaction verification system is potentially implemented as an overlay network on a given blockchain system, to enable more efficient handling of storage hardware (i.e. an improved and efficient memory space management) of each computing node of the plurality of computing nodes while allowing an active participation of any computing node in sending and receiving transactions and their verification and validation of a block, without the need (or without any obligation) to store a local copy of the whole blockchain or a copy of the block headers of the blockchain in any of the plurality of computing nodes.

Moreover, optionally, a given computing node (i.e. an echo node) potentially knows which of its peers have which distributed bloom filters. This is because of the way each node selects one of the "M" distributed bloom filters after computing the "M" root hashes of bloom trees. As already discussed above, each computing node selects one of the computed plurality of distributed bloom filters based on its public ID. This attribute allows a given computing node to always know which of its peers have which distributed bloom filters. Similar to the "Kademlia" distributed hash table, a given computing node's address table in the transaction verification system (i.e. the echo Network) has "M" buckets, each of which stores up to "L" peer addresses (e.g. IP addresses or device identifier of computing nodes). Each bucket contains a peer associated to a specific seed value of distributed bloom filter. As an example, peers in the third bucket, have IDs that get mapped to the number three (S=PID mod M=3), meaning that computing nodes in this bucket are responsible to store distributed bloom filters that have the number three as a seed value.

Optionally, whenever the given computing node (i.e. an echo node) receives an instruction (e.g. a message during the interactive proof or a peer contact renewal), the sender's contact information is attempted to be added or updated to the appropriate bucket. Adding given computing node's (i.e. an echo node's) contact information to a bucket is similar to that of the Kademlia's approach, for example, as described in operations given below:
  1. If the appropriate bucket contains less than "L" contacts and the sender's contact information is not in the bucket already, then the given computing node's (i.e. the echo node's) contact information is added to the bucket.
2. If the sender's contact information is already in the bucket, nothing is done.
3. If the bucket is full, i.e. it already has "L" contacts, then a random contact in the bucket gets pinged. If the pinged contact responds, the sender's contact is not added to the bucket.
4. If the randomly chosen contact does not respond, it is removed from the bucket and the sender's contact is added at the bucket.

Optionally, in the cases where a bucket has not been refreshed for a certain amount of time, the given computing node (i.e. the echo node) potentially pings the contacts of that bucket. If a contact does not respond, it gets removed from the bucket. If a bucket contains fewer than "L" contacts, "k" randomly chosen contacts from other buckets get contacted and asked to provide a contact for the given bucket. The provided contacts then get pinged. If a contact responds, the same rules as specified in the operations (points 1 to 4) apply. Whenever an interactive proof is initiated, a random peer from each bucket gets contacted.

Optionally, to prevent selfish use of the transaction verification system (i.e. the echo network, where an echo node that only stores the hash roots of bloom trees, but no multiple distributed bloom filters, a "proof of participation" is potentially used when renewing, or adding new peer addresses to buckets. Whenever a computing node (i.e. an echo node) pings one of its peers, with the purpose of renewing its peers address in its distributed hash table (DHT), or address table, the computing node (i.e. the echo node) requests its peer to provide a proof for a specific bloom block. If a peer is not able to provide such a proof, its address does not get renewed. The same procedure can be used during node discovery (i.e. when trying to add new addresses to one's address table), in an example, but not limited thereto. There are several ways how to prevent peers from using the proofs of other nodes as proof of participation, for example, the echo node could use h ($ID_A$, $ID_B$) mod m, (where $ID_A$ is the echo node's unique public identifier, $ID_B$ is the peer's unique public identifier, and "m" is the distributed bloom filter size). The generated number from h ($ID_A$, $ID_B$) mod m, potentially serves as the index, for which the bloom tree proof has to be provided.

Practical and Real-Life Applications of the Aforementioned Transaction Verification System The transaction verification system has many practical applications, for example, to improve blockchain systems in terms of memory space management, communication bandwidth-efficiency management, and operational stability of a given computing node, to verify and provide tamper-proof recordation of data entities of one or more transactions in the blockchain, without storing a copy of the blockchain (or even a copy of block headers of blocks of blockchain) in the given computing node. In an exemplary implementation, the transaction verification system is potentially used for verifying digital certificates to identify malicious digital certificates in a blockchain, where digital certificates are issued by trusted certificate authorities to each computing node of the blockchain. Moreover, the transaction verification system is potentially used to revoke such malicious digital certificates. Furthermore, optionally, in such implementation, each computing node has potentially access to a list of all the malicious digital certificates (or a partial list) revoked by the transaction verification system. In another exemplary implementation, the transaction verification system is potentially used for verifying data exchanged between torrent clients. In such implementation, each data entity is verified by the transaction verification system and malicious data is identified and removed to enable exchange of only secure and valid data. In yet another exemplary implementation, the transaction verification system is potentially used by each computing node to verify each changing log (also referred to as values) of a hash table associated with each computing node. The transaction verification system enables to identify incorrect logs that are exchanged between the computing nodes for updating of the hash table.

The present disclosure also relates to the method as described above. Various embodiments and variants disclosed above apply mutatis mutandis to the method. Optionally, the method comprises operating the transaction verification system to cause each computing node of the plurality of computing nodes to execute the pre-processing operation that comprises communicating a request of block headers up to a first defined constant value to other computing nodes of the plurality of computing nodes; and computing a plurality of distributed bloom filters up to a second defined constant value using a unique seed value.

Optionally, the method further comprises operating the transaction verification system to cause each computing node of the plurality of computing nodes to execute the pre-processing operation that further comprises: calculating the plurality of root hashes of the plurality of bloom trees up to the defined constant value for the plurality of distributed bloom filters; and computing a threshold value at each computing node using its own public identifier.

Optionally, the method comprises operating the transaction verification system to cause each computing node of the plurality of computing nodes to execute the pre-processing operation that further comprises: executing deletion of distributed bloom filters from the plurality of distributed bloom filters that are less than the computed threshold value to obtain the bloom block; and storing the bloom block that includes the one distributed bloom filter and the plurality of root hashes of the plurality of bloom trees, in each computing node after the executed deletion of the distributed bloom filters.

DETAILED DESCRIPTION OF THE DRAWINGS

Referring to FIG. 1 there is shown an illustration of a transaction verification system 100, in accordance with an embodiment of the present disclosure. The transaction verification system 100 verifies and provides tamper-proof recordation of data entities of one or more transactions in a blockchain. The transaction verification system 100 comprises a plurality of computing nodes depicted as computing nodes 102A, 102B, 102C to 102N that are mutually communicatively coupled via a data communication network 104 to exchange data therebetween. A given computing node for example computing node 102A of the plurality of computing nodes 102A, 102B, 102C to 102N is able to verify a presence of the one or more transactions in the blockchain. Moreover, the transaction verification system 100 operates to cause each computing node 102A, 102B, 102C to 102N to execute a pre-processing operation to obtain and store therein a corresponding bloom block (not shown). The bloom blocks of the computing nodes 102A, 102B, 102C to 102N are different from any block of the blockchain.

Figure 2:
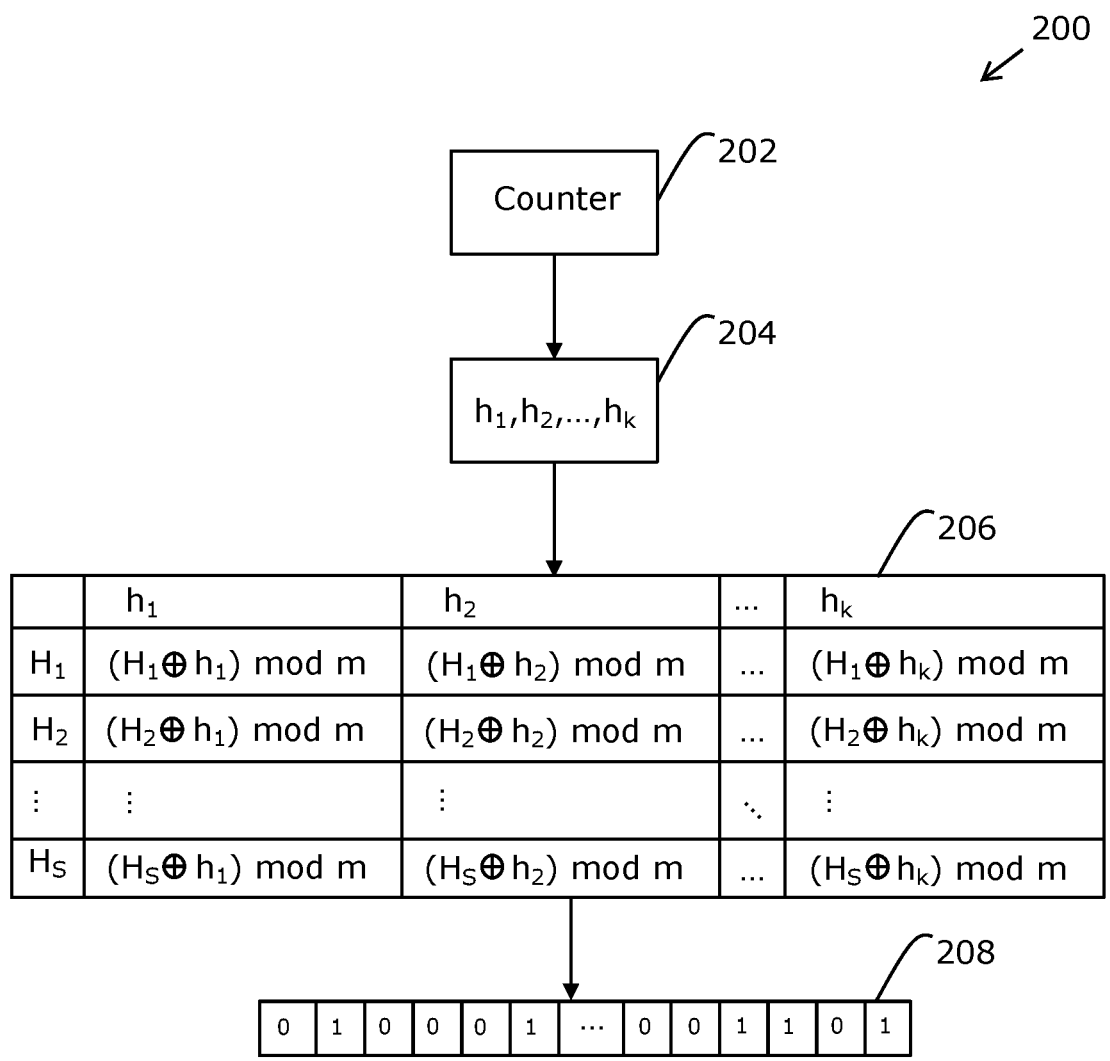
FIG. 2 is an illustration of an exemplary processing pipeline to derive an exemplary distributed bloom filter used by the transaction verification system of FIG. 1, in accordance with an embodiment of the present disclosure.

Referring to FIG. 2 there is shown a processing pipeline 200 for creation of an exemplary distributed bloom filter used by the transaction verification system of FIG. 1, in accordance with an embodiment of the present disclosure. At a step 202, a seed value such as a counter is selected. At a second step 204, the counter gets hashed "k" times to generate the hashes: $h_1$, $h_2$, $h_3$, $h_4$ to $h_k$. At a step 206, every transaction hash: $H_1$ up to $H_{S'}$ (where S' represents the set size) gets XORed with every hash: $h_1$, $h_2$, $h_3$, $h_4$ to $h_k$ generated in the step 204. Further, modulo "m" of each generated value is taken (where "m" is the chosen bloom filter size) so that every generated integer lies in a desired range. At a step 208, a bloom filter is populated with the values obtained at step 206 to form a distributed bloom filter. As shown, the distributed bloom filter is a data structure having an array that stores one of the binary bit values of "0" or "1" at each index of the array, wherein one or more transactions are inserted in the distributed bloom filter based on a position the "1" bit value at specified indices of the array.

FIGS. 3A and 3B are illustrations that depict exemplary Merkle trees and an exemplary Merkle multi-proof that is used by the transaction verification system of FIG. 1, in accordance with an embodiment of the present disclosure. Referring to FIG. 3A there is shown Merkle trees 300A, 300B and 300C. Each Merkle tree 300A, 300B and 300C has leaf nodes that define transactions: $T_1$, $T_2$, $T_3$ to $T_8$. The transactions: $T_1$, $T_2$, $T_3$ to $T_8$ are hashed and thus associated with a respective hash: $H_1$, $H_2$, $H_3$ to $H_8$. Further, all none-leaf nodes are associated with a hash: $H_{1,2}$, $H_{3,4}$, $H_{5,6}$, $H_{7,8}$, $H_{1,2,3,4}$ and $H_{5,6,7,8}$ that is formed from the hashes of its child nodes, as shown. Moreover, a root hash of the Merkle trees 300A, 300B and 300C is obtained by hashing the non-leaf nodes: $H_{1,2,3,4}$ and $H_{5,6,7,8}$. Typically, to verify that a single transaction is present in the Merkle trees 300A, 300B and 300C, a series of hashes are provided, which when are hashed with the transaction hash, a root hash of the Merkle tree 300A, 300B and 300C is recreated. In an example, for Merkle tree 300A, a series of hashes: $H_4$, $H_{1,2}$ and $H_{5,6,7,8}$ provides Merkle proof for verifying transaction $T_3$. In an example, for Merkle tree 300B, a series of hashes: $H_1$, $H_{3,4}$ and $H_{5,6,7,8}$ provides Merkle proof for verifying transaction $T_2$. In an example, for Merkle tree 300C, a series of hashes: $H_6$, $H_{7,8}$ and $H_{1,2,3,4}$ provides Merkle proof for verifying transaction $T_5$.

Referring to FIG. 3B, there is shown a modified Merkle tree 300D. The modified Merkle tree 300D is a Merkle multi-proof which is a group of Merkle proofs, to prove the presence of a list of transactions that are in the same Merkle tree 300D. In this embodiment, a series of hashes: $H_1$, $H_4$, $H_6$, $H_{7,8}$ (i.e. only four hashes) provides Merkle multi-proof for verifying three transactions $T_2$, $T_3$ and $T_5$ (instead of minimum eight hashes required in case of use of Merkle trees to verify three transactions, as shown and described in FIG. 3A). Beneficially, by using the multi-proof, the number of hashes needed to verify the presence of same set of transactions are reduced significantly.

Figure 4:
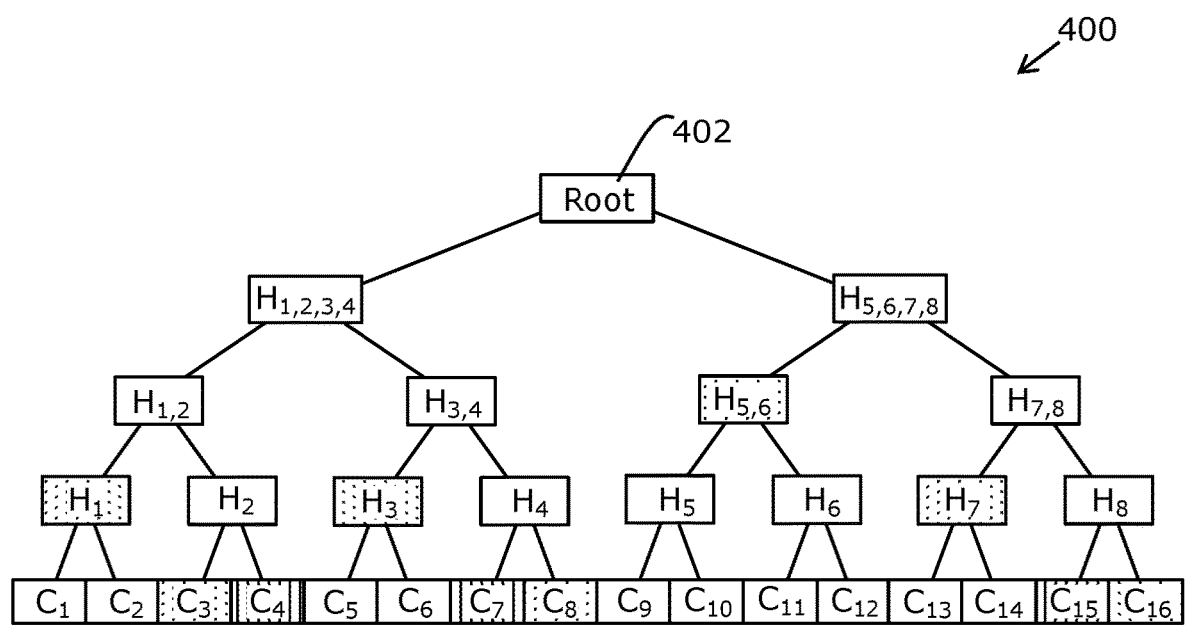
FIG. 4 is an illustration of an exemplary bloom tree with a root hash used by the transaction verification system of FIG. 1, in accordance with an embodiment of the present disclosure.

Referring to FIG. 4 there is shown an illustration of an exemplary bloom tree 400 with a root hash 402 used by the transaction verification system of FIG. 1, in accordance with an embodiment of the present disclosure. The bloom tree 400 combines the distributed bloom filter with the Merkle tree (an example shown in FIGS. 3A and 3B). The transaction verification system operates to cause each computing node to divide a distributed bloom filter into a set of chunks of bits $C_1$, $C_2$, $C_3$ to $C_{16}$, as shown in an example.

In an example, a bloom tree 400 has a chunk size of 256, and hashes for a specific transaction 'E' are potentially 800, 1602, 3650. Moreover, by dividing the given indices by the chunk size used for the bloom tree 400, chunks of the distributed bloom filter required to prove a given transaction is potentially deduced. In such an example, the chunks 4, 8, and 16 are deduced. In such an example, when forth chunk ($C_4$) is hashed with $C_3$ and $H_1$, as well as with the hashes of the other branches, we end up with the tree root, that is the root hash 402 of the bloom tree 400. By knowing that $C_4$ has to get hashed twice with other hashes from the left side (with $C_3$ and $H_1$), it can deduce that $C_4$ must indeed be the fourth chunk ($C_4$) in the distributed bloom filter. By knowing this, and by knowing that the first three chunks have 768 bits, an index of the fourth chunk ($C_4$) is checked if the given value is one or zero. Moreover, based on this a presence or absence of a transaction is checked in a bandwidth efficient way. In such an example, if all the given indices, in all the dedicated chunks are set to one, a multi-proof is sent to a recipient containing the necessary hashes and chunks to recreate the root hash 402. If one chunk for a given transaction contains a zero, a Merkle proof of only that chunk is sent to the recipient.

In another example, a multi-proof is an array of the form [$C_4$; $C_3$; $H_1$; $H_{3,4}$; $C_{10}$; $C_9$; $H_6$; $C_{15}$; $C_{16}$; $H_7$]. As multi-proofs do not have a fixed size, hashing the provided array without any additional information is not possible. A recipient knows 'k' indices of a transaction whose presence is to be verified. Given the 'k' indices, the recipient of the proof can deduce the chunk indices. From the chunk indices, the recipient can know if the chunks should be hashed from the right side, or the left side with respect to a reference. Moreover, knowing the chunk indices provides with information about the tree height at which two chunks meet. In such an example, for chunks $C_3$ and $C_{10}$ the node leaves meet on height 4 of the tree. In such an example, for $C_{10}$ and $C_{15}$ the leaves meet at height 3, a shown. Moreover, by having the multi-proof array, and by knowing at which height the chunks meet, the recipient can immediately deduce that for the chunk $C_4$ in the array [$C_4$; $C_3$; $H_1$; $H_{3,4}$; $C_{10}$; $C_9$; $H_6$; $C_{15}$; $C_{16}$; $H_7$], the next three elements ($C_3$; $H_1$; $H_{3,4}$) are to be considered and hashed sequentially with the chunk $C_4$. The same logic gets applied for the other chunks as well. To compute at which height chunks in the tree meet, aforesaid steps are performed until termination. An example of an algorithm to find tree height is provided in the Appendix section.

Figure 5:
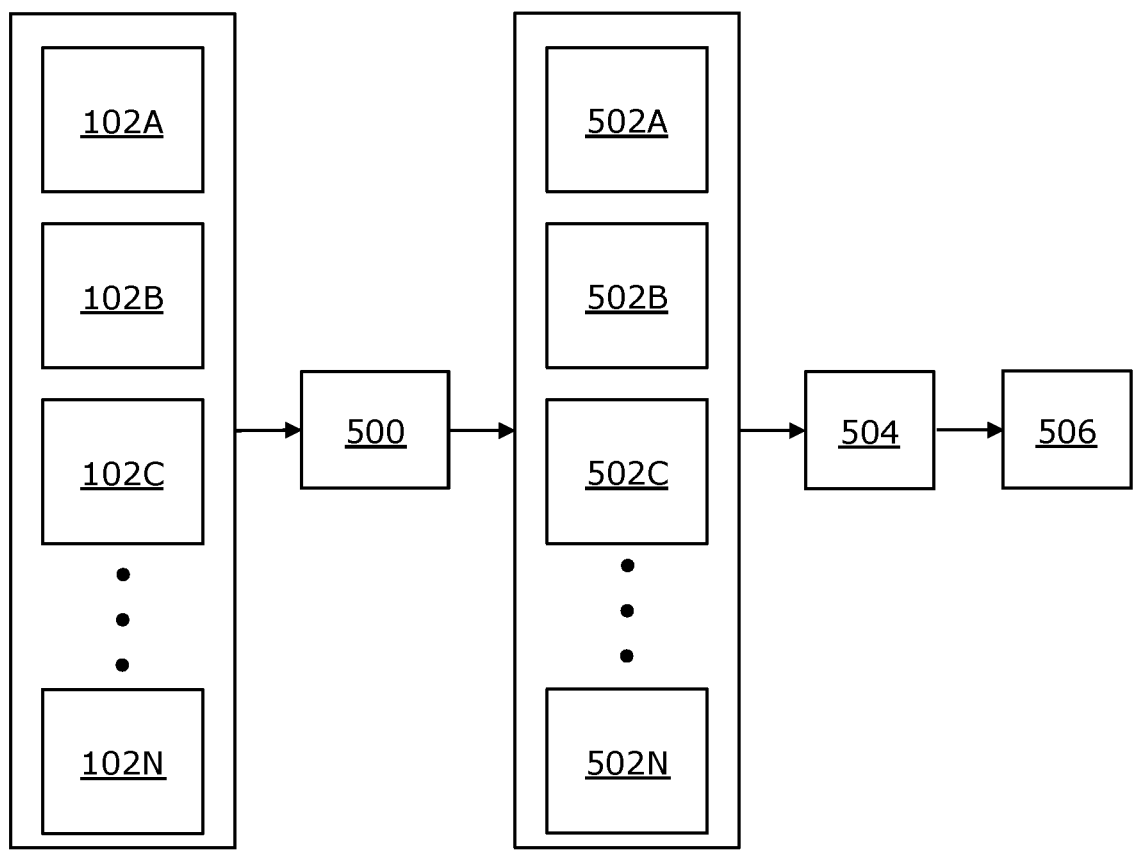
FIG. 5 is an exemplary scenario of implementation of the transaction verification system of FIG. 1, when in operation, in accordance with an embodiment of the present disclosure.

Referring to FIG. 5 there is shown an exemplary scenario of implementation of the transaction verification system of FIG. 1, when in operation, in accordance with an embodiment of the present disclosure. As show, the transaction verification system 100 comprises the plurality of computing nodes 102A, 102B, 102C to 102N. Each computing node 102A, 102B. 102C to 102N executes a pre-processing operation 500 to obtain and store therein corresponding bloom blocks depicted as bloom blocks 502A, 502B, 502C to 502N such that the computing node 102A obtains a bloom block 502A, the computing node 102B obtains a bloom block 502B, the computing node 102C obtains a bloom block 502C and so on. In order to verify a presence of a first transaction of the one or more transactions, a given computing node (such as the computing node 102A) of the plurality of computing nodes 102A, 102B, 102C to 102N initiates an interactive proof by interacting with a specified number of computing nodes from the plurality of computing nodes 102A, 102B, 102C to 102N, wherein the interactive proof is initiated post-completion of the pre-processing operation at each computing node 102A, 102B, 102C to 102N. Moreover, the transaction verification system 100 operates to cause the computing node 102A to initiate the interactive proof by communicating a request for a multi-proof 504 to the specified number of computing nodes from the plurality of computing nodes 102A, 102B, 102C to 102N. Further, a proof of absence or proofs of presence 506 is obtained in the interactive proof by interacting with the specified number of computing nodes, to accurately and quickly verify and confirm the presence or absence of the first transaction.

Figure 6:
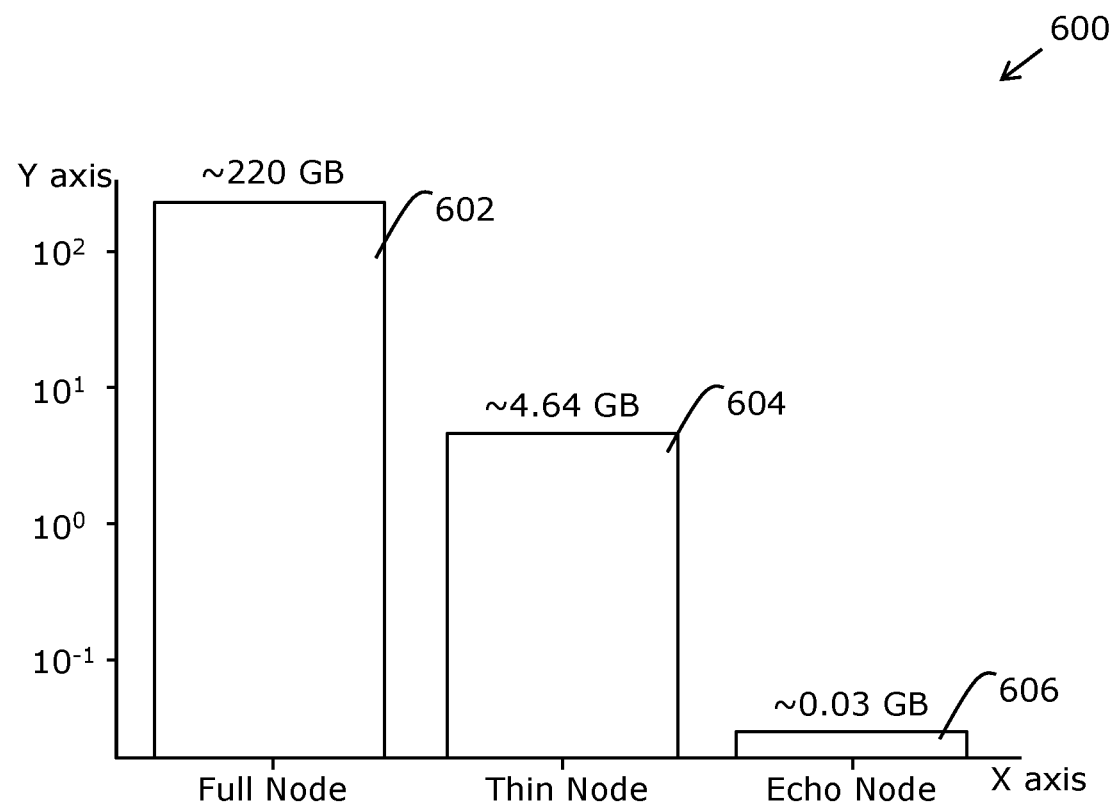
FIG. 6 is an illustration that depicts a graphical representation of an operating performance of the transaction verification system of FIG. 1 vis-h-vis known systems, in accordance with an embodiment of the present disclosure.

Referring to FIG. 6 there is shown an illustration that depicts a graphical representation 600 of an operating performance of the transaction verification system of FIG. 1 vis-h-vis known systems, in accordance with an embodiment of the present disclosure. The graphical representation 600 depicts a first bar 602 depicting a storage space required by a full node to store a local copy of a blockchain used in the conventional systems. Based on experimentation, it was observed storage space required by the full node was approximately 220 gigabytes (GB). The graphical representation 600 depicts a second bar 604 depicting a storage space required by a thin node to store block headers of the same blockchain used by the full node in the conventional systems. In this case, the storage space required by a thin node was reduced but still was approximately 4.64 gigabytes. The graphical representation 600 depicts a third bar 606 depicting a storage space required by an echo node (a given computing node of the transaction verification system) used in the present disclosure to verify presence of a transaction in the blockchain without storing a local copy of the blockchain. In this case, the storage space required by the echo node (that stores a bloom block instead of storing the local copy of the blockchain) was significantly reduced to approximately 0.03 gigabytes.

Figure 7:
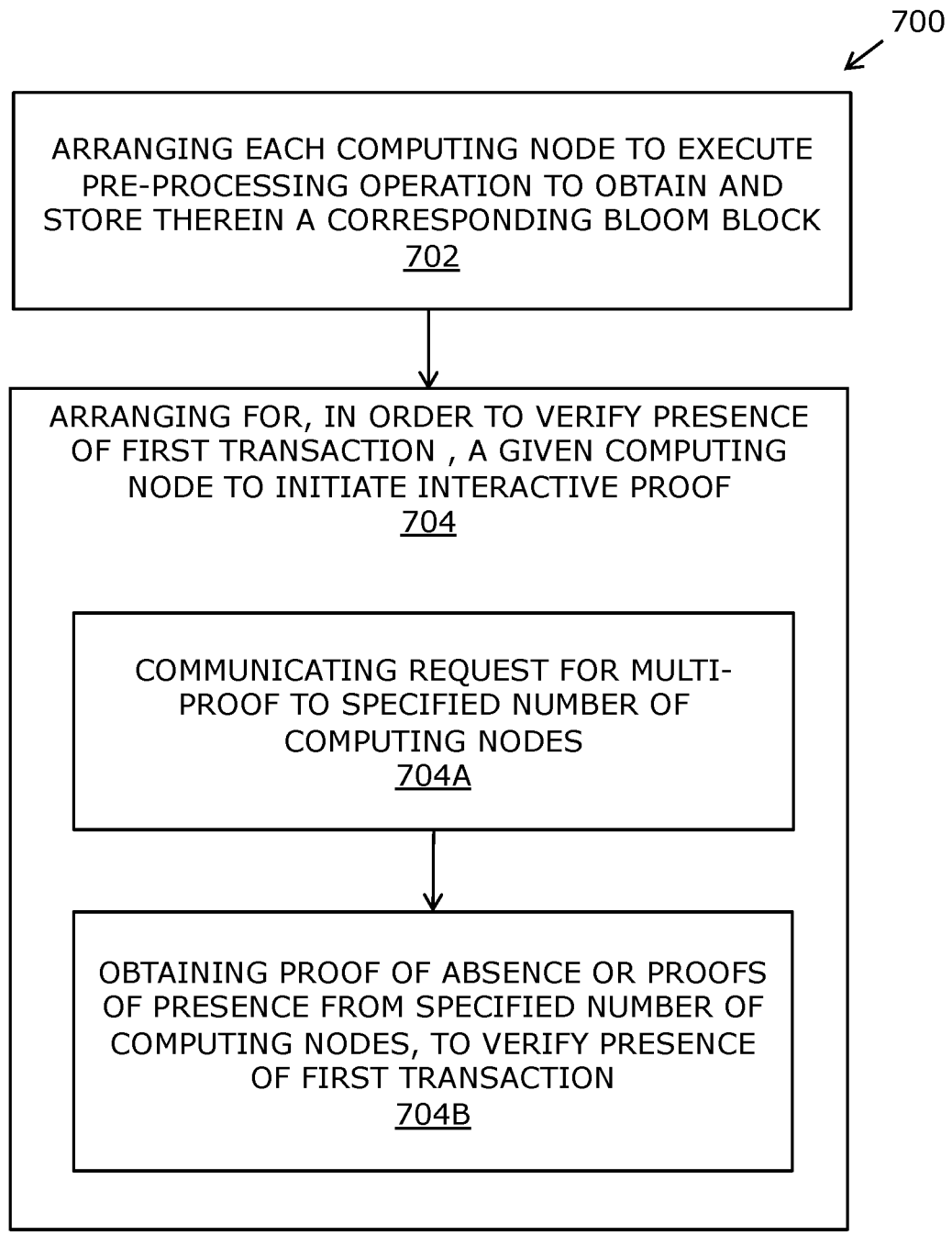
FIG. 7 is a flow chart of a method of (namely, a method for) for operating a transaction verification system, in accordance with an embodiment of the present disclosure.

Referring to FIG. 7 there is shown a flow chart of a method 700 of (namely, a method for) for operating a transaction verification system, in accordance with an embodiment of the present disclosure. The transaction verification system when in operation, verifies and provides tamper-proof recordation of data entities of one or more transactions in a blockchain. The system comprises a plurality of computing nodes that are mutually communicatively coupled via a data communication network to exchange data therebetween, wherein a given computing node of the plurality of computing nodes is able to verify a presence of the one or more transactions in the blockchain. At a step 702, a pre-processing operation is executed by each computing node to obtain and store therein a corresponding bloom block. At a step 704, a given computing node of the plurality of computing nodes is arranged, in order to verify a presence of a first transaction of the one or more transactions, to initiate an interactive proof by interacting with a specified number of computing nodes from the plurality of computing nodes, wherein the interactive proof is initiated post-completion of the pre-processing operation at each computing node. The interactive proof is executed by steps 704A and 704B. At a step 704A, interactive proof is initiated by the given computing node by communicating a request for a multi-proof to the specified number of computing nodes from the plurality of computing nodes. At a step 704B, a proof of absence from one of the specified number of computing nodes, or proofs of presence from the specified number of computing nodes is obtained in the interactive proof, to verify the presence of the first transaction.

The steps 702, 704, 704A, and 704B are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

APPENDIX

An exemplary algorithm to find a tree height where two chunks (i.e. two leaves of a bloom tree) meet in the aforementioned transaction verification system of the present disclosure is elucidated below.

$x_1, x_2 \leftarrow$ Chunk$_1$, Chunk$_2$;
height $\leftarrow 0$;
while $x_2 - x_1 \neq 0$ do
$\quad x_1, x_2 \leftarrow \left[\frac{x_1}{2}\right], \left[\frac{x_2}{2}\right]$;
$\quad$ height $\leftarrow$ height $+ 1$;
end

The invention claimed is:

1. A transaction verification system that, when in operation, verifies and provides tamper-proof recordation of data entities of one or more transactions in a blockchain, the transaction verification system comprising:
   plurality of computing nodes that are mutually communicatively coupled via a data communication network to exchange data therebetween, wherein a given computing node of the plurality of computing nodes is configured to:
   verify a presence of the one or more transactions in the blockchain,
   execute a pre-processing operation to obtain and stow therein a corresponding bloom block, wherein the bloom blocks of the computing nodes air different from any block of the blockchain,
   include, via its corresponding bloom block, a plurality of root hashes of a plurality of bloom trees and a distributed bloom filter, wherein the plurality of bloom trees have distributed bloom filters that are distributed within the plurality of computing nodes, wherein the distributed bloom filters define a set of transactions, and the plurality of bloom trees are associated with different distributed bloom filters spread across the plurality of computing nodes,
   in order to verify a presence of a first transaction of the one or more transactions, initiate an interactive proof by interacting with a specified number of computing nodes from the plurality of computing nodes, wherein the interactive proof is initiated post-completion of the pre-processing operation at each computing node, and
   wherein the given computing node initiates the interactive proof by being configured to:
   (i) communicate a request for a multi-proof to the specified number of computing nodes from the plurality of computing nodes; and
   (ii) obtain a proof of absence from one of the specified number of computing nodes, or proofs of presence from the specified number of computing nodes, to verify the presence of the first transaction, wherein verifying the presence of the first transaction is performed without storing a copy of the blockchain in the plurality of computing nodes to reduce memory use in each of the plurality of computing nodes.

2. The transaction verification system of claim 1, wherein each computing node of the plurality of computing nodes is further configured to:
communicate a request of block headers up to a first defined constant value to other computing nodes of the plurality of computing nodes; and
compute a plurality of distributed bloom filters up to a second defined constant value using a unique seed value.

3. The transaction verification system according to claim 2, wherein each computing node of the plurality of computing nodes is further configured to:
calculate the plurality of root hashes of the plurality of bloom trees up to the defined second constant value for the plurality of distributed bloom filters; and
compute a threshold value at each computing node using its own public identifier.

4. The transaction verification system according to claim 3, wherein each computing node of the plurality of computing nodes is further configured to:
compute a bloom tree of the plurality of bloom trees by dividing a distributed bloom filter of the plurality of plurality of distributed bloom filters into a set of chunks of bits.

5. The transaction verification system according to claim 4, wherein each computing node is further configured to utilize the set of chunks of bits to compute the bloom tree, wherein each chunk of the set of chunks are hashed, and the hashes of each chunk are further hashed in a multitier structure until a root hash of the bloom tree is obtained.

6. The transaction verification system according to claim 5, wherein each computing node of the plurality of computing nodes is further configured to:
execute deletion of distributed bloom filters from the plurality of distributed bloom filters that are less than the computed threshold value to obtain the bloom block; and
store the bloom block that includes the one distributed bloom filter and the plurality of root hashes of the plurality of bloom trees, in each computing node after the executed deletion of the distributed bloom filters.

7. The transaction verification system according to claim 1, wherein the plurality of computing nodes comprises a different bloom block which differs in at least the stored distributed bloom filter post completion of the pre-processing operation at each computing node of the plurality of computing nodes.

8. The transaction verification system according to claim 1, wherein the given computing node is further configured to terminate the interaction with the specified number of computing nodes on receipt of the proof of absence from one of the specified number of computing nodes or on receipt of the proofs of presence from the specified number of computing nodes.

9. The transaction verification system according to claim 1, wherein the one distributed bloom filter has a first false positive value, and wherein the one distributed bloom filter is a data structure having an array that stores one of the binary bit values of "0" or "1" at each index of the array, wherein the one or more transactions are inserted in the one distributed bloom filter based on a position the "1" bit value at specified indices of the array.

10. The transaction verification system according to claim 9, wherein the obtaining of the proofs of presence from the specified number of computing nodes during the interactive proof at least reduces the first false positive value by at least the specified number so that the presence of the first transaction is successfully confirmed.

11. A method for operating a transaction verification system to verify and provide tamper-proof recordation of data entities of one or more transactions in a blockchain, wherein the system comprises a plurality of computing nodes that are mutually communicatively coupled via a data communication network to exchange data therebetween, wherein a given computing node of the plurality of computing nodes is configured to verify a presence of the one or more transactions in the blockchain, wherein the method includes:
(i) arranging for each computing node to execute a pre-processing operation to obtain and store therein a corresponding bloom block,
wherein the bloom blocks of the computing nodes are different from any block of the blockchain,
wherein, via its bloom block, each computing node includes a plurality of root hashes of a plurality of bloom trees and a distributed bloom filter,
wherein the plurality of bloom trees have distributed bloom filters that are distributed within the plurality of computing nodes,
wherein the distributed bloom filters define a set of transactions, and the plurality of bloom trees are associated with different distributed bloom filters spread across the plurality of computing nodes,
(ii) arranging for, in order to verify a presence of a first transaction of the one or morn transactions, a given computing node of the plurality of computing nodes to initiate an interactive proof by interacting with a specified number of computing nodes from the plurality of computing nodes, wherein the interactive proof is initiated post-completion of the pre-processing operation at each computing node, and
wherein the given computing node initiates the interactive proof by:
(i) communicating a request for a multi-proof to the specified number of computing nodes from the plurality of computing nodes; and
(ii) obtaining a proof of absence from one of the specified number of computing nodes, or proofs of presence from the specified number of computing nodes, to verify the presence of the first transaction,
wherein verifying the presence of the first transaction is performed without storing a copy of the blockchain in the plurality of computing nodes to reduce memory use in each of the plurality of computing nodes.

12. The method according to claim 11, wherein the method further comprises:
communicating, by each computing node of the plurality of computing nodes, a request of block headers up to a first defined constant value to other computing nodes of the plurality of computing nodes; and
computing, by each computing node of the plurality of computing nodes, a plurality of distributed bloom filters up to a second defined constant value using a unique seed value.

13. The method according to claim 12, wherein the method further comprises:
calculating, by each computing node of the plurality of computing nodes, the plurality of root hashes of the plurality of bloom trees up to the defined constant value for the plurality of distributed bloom filters; and computing, by each computing node of the plurality of computing nodes, a threshold value at each computing node using its own public identifier.

14. The method according to claim 13, wherein the method further comprises:

executing, by each computing node of the plurality of computing nodes, deletion of distributed bloom filters from the plurality of distributed bloom filters that are less than the computed threshold value to obtain the bloom block; and storing, by each computing node of the plurality of computing nodes, the bloom block that includes the one distributed bloom filter and the plurality of root hashes of the plurality of bloom trees, in each computing node after the executed deletion of the distributed bloom filters.

15. A computer program product comprising non-transitory computer readable storage media having computer-readable instructions stored thereon, the computer-readable instructions being executable by a computerized device comprising processing hardware to execute a method of claim 11.

* * * * *